United States Patent [19]
Nussbaumer et al.

[11] Patent Number: 5,238,337
[45] Date of Patent: Aug. 24, 1993

[54] METHOD OF MACHINING ROUND MATERIAL OR THE LIKE BY THE WHIRLING PROCESS

[75] Inventors: Walter Nussbaumer; Karl-Heinz Beyrer; Josef Mark, all of Ravensburg, Fed. Rep. of Germany

[73] Assignee: Maschinenfabrik Ravensburg AG, Ravensburg, Fed. Rep. of Germany

[21] Appl. No.: 802,241

[22] Filed: Dec. 9, 1991

[30] Foreign Application Priority Data

Dec. 14, 1990 [DE] Fed. Rep. of Germany ....... 4040057

[51] Int. Cl.$^5$ .............................................. B23D 45/08
[52] U.S. Cl. ...................................... 409/132; 83/54; 409/200
[58] Field of Search ................. 82/106; 409/131, 132, 409/199, 200; 83/54, 875

[56] References Cited

U.S. PATENT DOCUMENTS

| | | | |
|---|---|---|---|
| 3,817,149 | 6/1974 | Reutlinger | 409/132 |
| 4,305,689 | 12/1981 | Yamade et al. | 409/200 |
| 4,471,678 | 9/1984 | Davis . | |
| 4,607,550 | 8/1986 | Berbalk . | |
| 4,679,973 | 7/1987 | Kodama et al. | 409/200 |

FOREIGN PATENT DOCUMENTS

| | | |
|---|---|---|
| 0084379 | 7/1983 | European Pat. Off. . |
| 725569 | 9/1942 | Fed. Rep. of Germany . |
| 1893372 | 3/1964 | Fed. Rep. of Germany . |
| 1502705 | 1/1970 | Fed. Rep. of Germany . |
| 2449156 | 6/1976 | Fed. Rep. of Germany . |
| 3215385 | 11/1983 | Fed. Rep. of Germany . |
| 2388625 | 12/1978 | France ............ 83/54 |
| 2557823 | 7/1985 | France . |
| 207873 | 3/1984 | German Democratic Rep. . |
| 14990 | 2/1977 | Japan ............ 83/54 |
| 66609 | 4/1983 | Japan ............ 409/132 |
| 59-24911 | 2/1984 | Japan . |

OTHER PUBLICATIONS

Bertram, Von F., "Gewindewirbeln Ein erfolgreiches Verfahren in der Fertigungstechnik", Technische Rundschau No. 40/73, Sep. 14th, 1973.
Luger, "Lexikon der Technik", vol. 31, pp. 360–361.

Primary Examiner—Daniel W. Howell
Attorney, Agent, or Firm—Spencer, Frank & Schneider

[57] ABSTRACT

A method for machining round material and in particular tubes by the whirling process, in which the whirling tool is designed as an annular cutting tool having an internal tooth system. The center point of the whirling tool is guided from the start on a path or curve so that a tube wall, for example, is not cut through by a linear feed but by a curve-like feed. This curve is followed via a CNC system. Due to the whirling process, which starts immediately, the length of cut of the tool in the workpiece is given a virtually uniform value just after the start of machining so that the chip volume can be optimized. In this way, the radial and tangential forces on the tool can also be reduced, which leads to optimization of the tool.

8 Claims, 5 Drawing Sheets

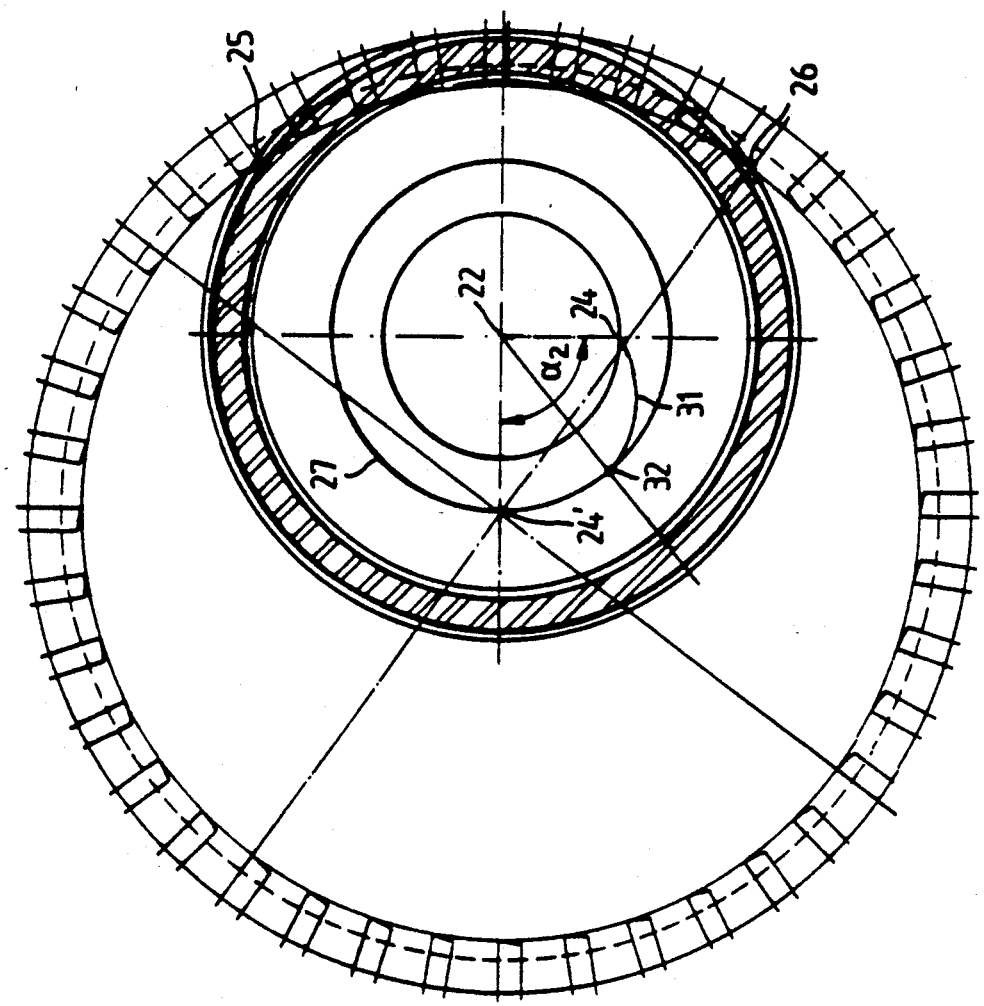

METHOD OF MACHINING ROUND MATERIAL OR THE LIKE BY THE WHIRLING PROCESS

BACKGROUND OF THE INVENTION

The invention relates to a method of machining round material or the like by the whirling process. The whirling process consists of clamping a workpiece for machining into a whirling unit. The workpiece is held stationary with regard to its longitudinal center axis. A whirling annular cutting tool having an internal tooth system is traversable on a compound slide. The tool is movable in a perpendicular plane relative to the longitudinal center axis of the workpiece. Cutting movement of the tool occurs as a result of a displacement of the tool's flight-circle center point on a flight-circle center point path.

PRIOR ART

The whirling process has already become known especially from thread whirling (Journal: Technische Rundschau No. 40/73 of 14.09.73; reprint pp. 1 to 16; Lueger, Lexikon der Technik, volume 31, p. 360 ff.). The whirling process is a production machining process in which the tool orbits the workpiece in a spiraling/whirling manner. The cut depth is produced in one operation by one or more blades revolving at high cutting speed. In the process, the inner circumferential surface formed by the cutting tool and having the so-called flight-circle diameter rolls on the cylindrical outer circumferential surface of the tool to be machined. Superimposed on this motional action is the constantly orbiting movement of the cutting tool.

The whirling process has become known largely for producing threads of all types. It is distinguished in particular by high cutting speeds with a plurality of blades or cutters, the mode of operation of the whirling head corresponding to a milling operation (whirling milling process) with a revolving turning tool. The circular path of the rapidly revolving tool is here displaced eccentrically relative to the cross-section of the workpiece to be machined, for example, externally, the flight-circle center point likewise rotating on a circular path.

The whirling process has the advantage that a multiplicity of cutting tools, in particular cutters, can be arranged side by side, which cutting tools are simultaneously in engagement with the workpiece over a large segment area. However, the machining depth into the workpiece is determined by the maximum possible plunge-cutting depth of the individual cutters or blades. This is generally restricted to a small plunge-cutting dimension on account of the design of the cutters or blades. In particular, it is not possible to cut through round materials or thick-walled tubes with conventional whirling units. Furthermore, the technical outlay for installing the multiplicity of cutters is considerable.

A round material, such as, for example, a tube or a solid material, is generally cut off by sawing, a distinction being made between circular saw blades and linear saw blades. When circular saws having an external tooth system are used, it is disadvantageous that, when the circular saw meets the circular round material, first of all sudden loading occurs on one tooth or only a few teeth. For a moment, circular saw blade and round material are in contact merely at one point, which leads to high tooth loading. When the circular saw blade penetrates the round material, more and more teeth only come into engagement gradually, and only then is the tooth loading reduced. Owing to the fact that the teeth are located at the outermost margin of the circular saw blade, the diameter of which is also determined by the thickness of the round material to be sawn, intense vibrations can occur at the saw blade. In addition, if a tube is sawn through by a conventional circular saw blade having an external tooth system, sudden tooth loading occurs, after the wall thickness is cut through, upon entering and leaving the wall material, which takes place twice when the wall thickness is cut through. This leads to sudden loading of the circular saw blade and thus to increased tooth loading with vibrations.

The effective plunge-cutting radius of the circular saw blade having an external tooth system must be selected to be so large that it can cut through the complete diameter of the round material. However, a circular saw blade of large diameter has a substantially greater tendency to vibrate.

The disadvantages described above of sawing with a circular saw blade having an external tooth system accordingly also apply to a linear saw blade, such as, for example, a hacksaw.

In order to avoid these disadvantages, DD-207,873 has disclosed an annular sawing machine for cutting tubes to length, in which an annular sawing machine having a whirling sawing tool arranged on a compound table and having an internal tooth system is used. In this device, the advantages of the whirling process are also utilized for cutting through round material, the whirling tool being designed as a circular saw blade having an internal tooth system. If the whirling process is used with an internally toothed circular saw blade, the abovementioned disadvantages are at least partly eliminated. This is because the cutting teeth of the internally toothed circular saw blade can penetrate the workpiece tangentially. As in thread whirling, the internally toothed saw blade cuts into the round material to be machined and performs a smooth and low-vibration operation. On account of the whirling process, the effective penetration radius of the whirling tool need only comprise the wall thickness of the workpiece. If the workpiece is a solid material, the whirling tool only has to penetrate as far as the center point of the solid material, since the other half of the workpiece is cut off by the orbiting of the whirling tool on the flight-circle diameter. Compared with a conventional circular saw blade, a whirling tool therefore penetrates the workpiece to a smaller depth, and the effective diameter of cut lies substantially closer to the tool center point. This results in a low-vibration operation. On account of the design of the whirling tool as a circular saw blade having an internal tooth system, thick-walled tubes or a solid material can also be readily cut off by the whirling process without damaging the tool, since the cut depth can be made substantially greater with such a circular saw blade than is the case in conventional whirling tools having cutters. Since the machining of the material also takes place inside the circular saw blade, less vibrations also occur.

In the known device according to DD-207,873, the whirling tool plunges at constant rotation with an at first only linear movement of the tool center point into the workpiece until the wall thickness of the tube to be cut off is cut through at this point. Only then does the actual whirling action start with a movement of the tool center point on the so-called flight-circle center-point path. This has the disadvantage that negative relationships like those which prevail during sawing with a hacksaw prevail during the linear plunging of the tool into the workpiece. In particular, the lengths of cut also vary greatly here, which leads to a chip-space volume which varies greatly. Different lengths of cut also result in different radial and tangential forces on the tool, which requires adaptation of the tool.

SUMMARY OF THE INVENTION

The method according to the invention relates to a further development of the working method according to DD-207,873. Compared with this, it has the advantage that the machining of the workpiece is carried out by the whirling process from the start. For this purpose, the center point of the whirling tool is guided from the start on a path or curve so that a tube wall, for example, is not cut through by a linear feed but by a curve-like feed. This curve is followed via a CNC system. Due to the whirling process, which starts immediately, the length of cut of the tool in the workpiece is given a virtually uniform value just after the start of machining so that the chip volume can be optimized. In this way, the radial and tangential forces on the tool can also be reduced, which leads to optimization of the tool.

BRIEF DESCRIPTION OF THE DRAWINGS

Further particulars of the invention are described in more detail below, with further advantages being indicated, and are shown in the drawings, in which:

FIGS. 4a-e show the sequence of the method during the machining.

DETAILED DESCRIPTION OF THE PREFERRED EMBODIMENT

Figure 2:
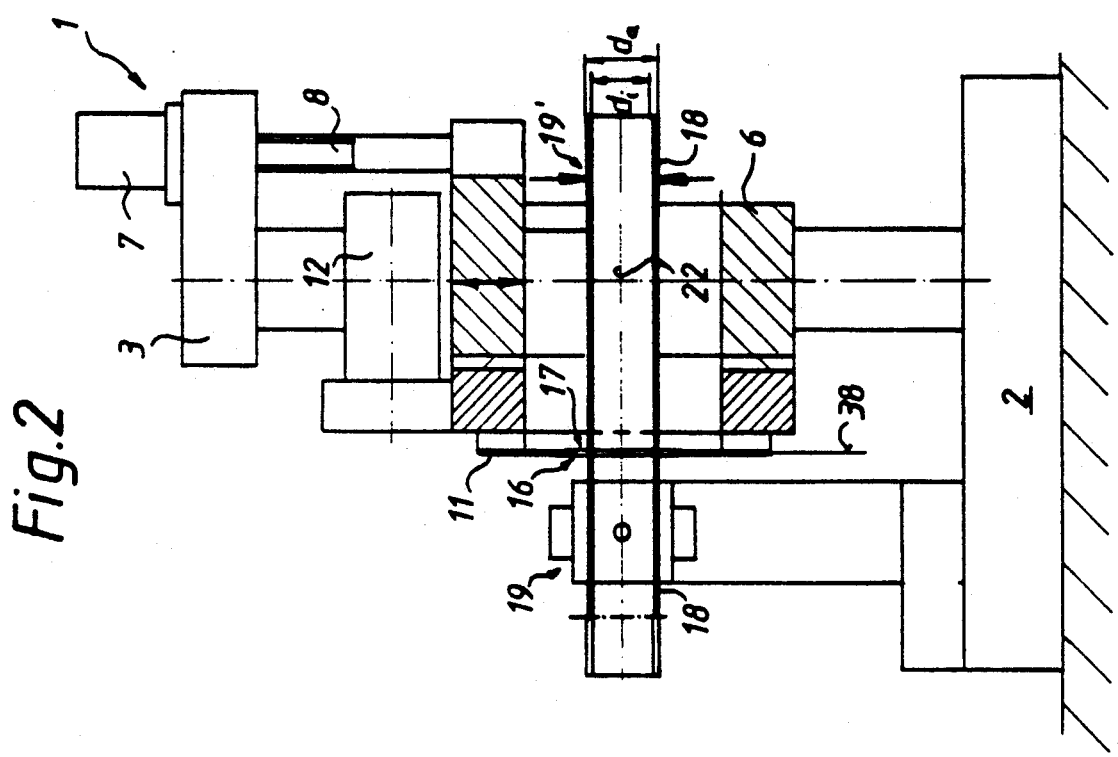
FIG. 2 shows a side elevation of the whirling unit.
Figure 1:
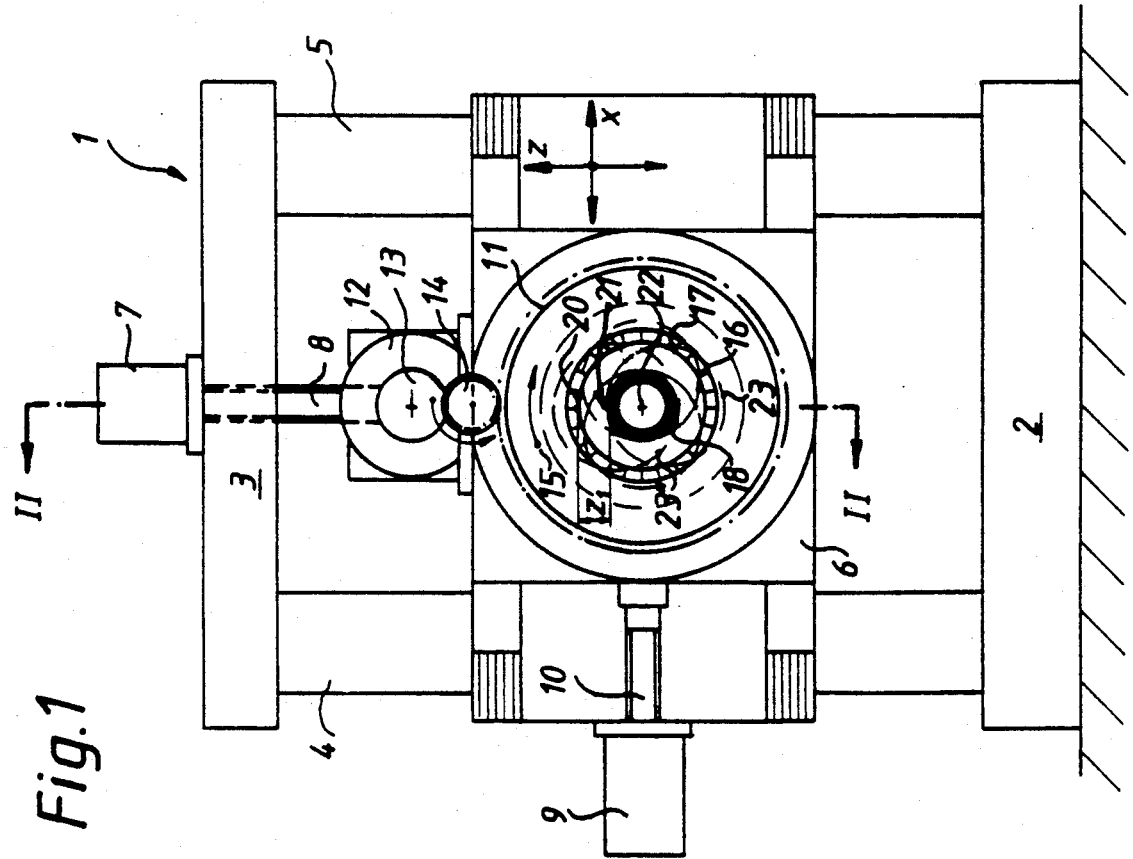
FIG. 1 shows a front elevation of a whirling unit.

First of all the device for carrying out the method is to be described in more detail:

The whirling unit 1 shown in FIG. 1 in front elevation and in FIG. 2 in side elevation is constructed in a portal style. For this purpose, at least two vertical columns 4, 5 are arranged between a base plate 2 and a top yoke 3, on which columns 4, 5 a CNC compound slide moves in the vertical direction (Z-axis). The feed movement for the up and down movement of the compound slide 6 is effected via a feed motor 7 via a drive shaft 8. Apart from the up and down movement, the compound slide 6 performs a movement in the X-axis, i.e. a movement in the vertical plane 38. A further feed motor 9 having a drive shaft 10 is provided for this horizontal or transverse movement in the X-axis.

Located on the front side of the compound slide 6 is a driving rim 11 which is driven by a motor 12 via a gear 13 and an intermediate pinion 14. The rotational movement of the driving rim 11 is shown by arrow 15. Fastened inside the driving rim 11 is the whirling tool 16, which as a whirling milling tool or as a circular saw blade is provided with an internal tooth system 17 only shown schematically in FIG. 1. The workpiece 18, which is designed, for example, as a thick-walled tube, is first of all located concentrically inside the whirling tool 16 provided with the internal tooth system 17 (see FIG. 4a). In the exemplary embodiment, the whirling unit 1 is intended to cut through the workpiece designed as a thick-walled tube 18. For this purpose, the tube 18 is firmly clamped in place via a clamping device 19 in front of the whirling tool 16 and a further clamping device 19' in the rear area of the whirling unit. The inside diameter of the tube 18 is designated by $d_i$, and the outside diameter is designated by $d_a$ (see FIG. 2, 3).

Figure 4B:
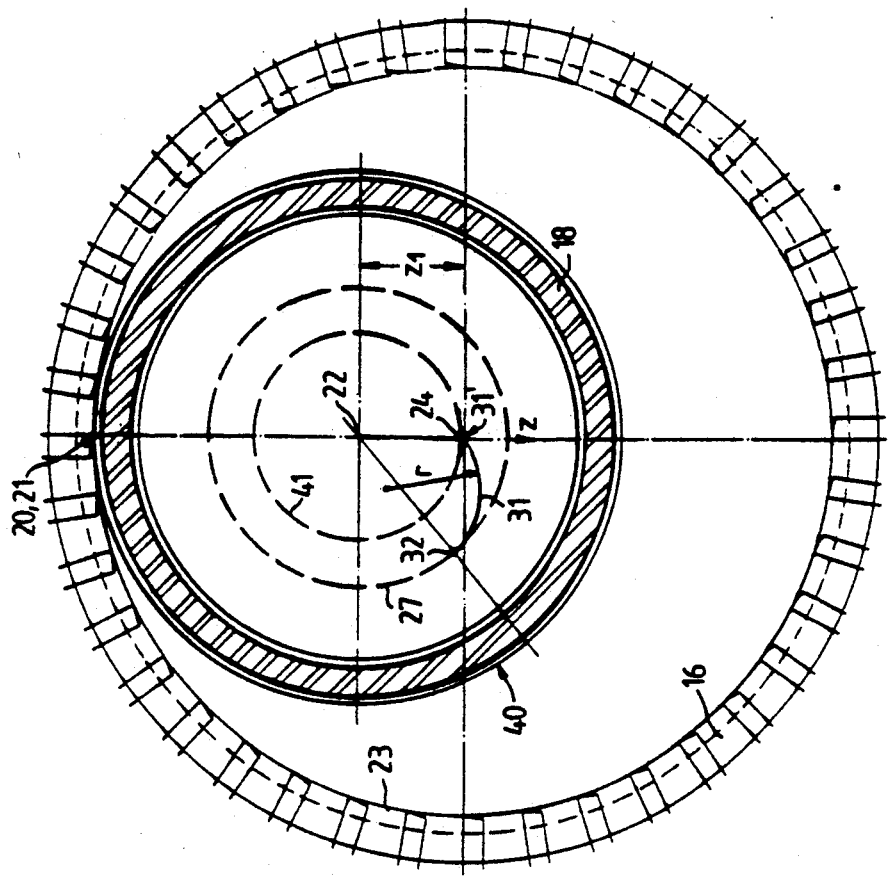

On account of the range of movement of the compound slide 6, e.g. in the Z-direction, the whirling tool, designed, for example, as a circular saw blade and having an internal tooth system 17, can first of all be moved down by the amount $z_1$ (see FIGS. 1, 4a) so that the tooth 20 of the circular saw blade located in the topmost position in each case can touch the topmost point 21 of the tube (see FIG. 4b). Of course, this movement can also be effected by any other approach movement of the tool to the workpiece, that is, for example, in the transverse direction.

The longitudinal center axis 22 of the workpiece 18 therefore remains unchanged in its position. Merely the center point 24 of the whirling tool is moved first in one direction via the compound slide 6 until the imaginary inner circumferential surface, or inner envelope circle, 23 of the tool 16 comes in contact with the outer circumferential surface 40 of the workpiece 18. As a result, the center point 24 of the tool 16 travels in the Z-direction by the amount $z_1$ and lies on a circle 41 about the center point 22 (see FIG. 4b). If the whirling tool 16 were now to revolve with its flight-circle center point 24 on the flight-circle center-point path 41, the inner envelope circle 23 would merely roll on the outer envelope circle 40 without the tool 16 penetrating the workpiece in a metal-cutting manner (see FIG. 4b). The tool 16 therefore has to perform a further feed movement in the direction of workpiece 18, as indicated in FIG. 3 by the linear feed $z_2$, for cutting through the wall thickness $s = z_2$ of the workpiece.

Figure 3:
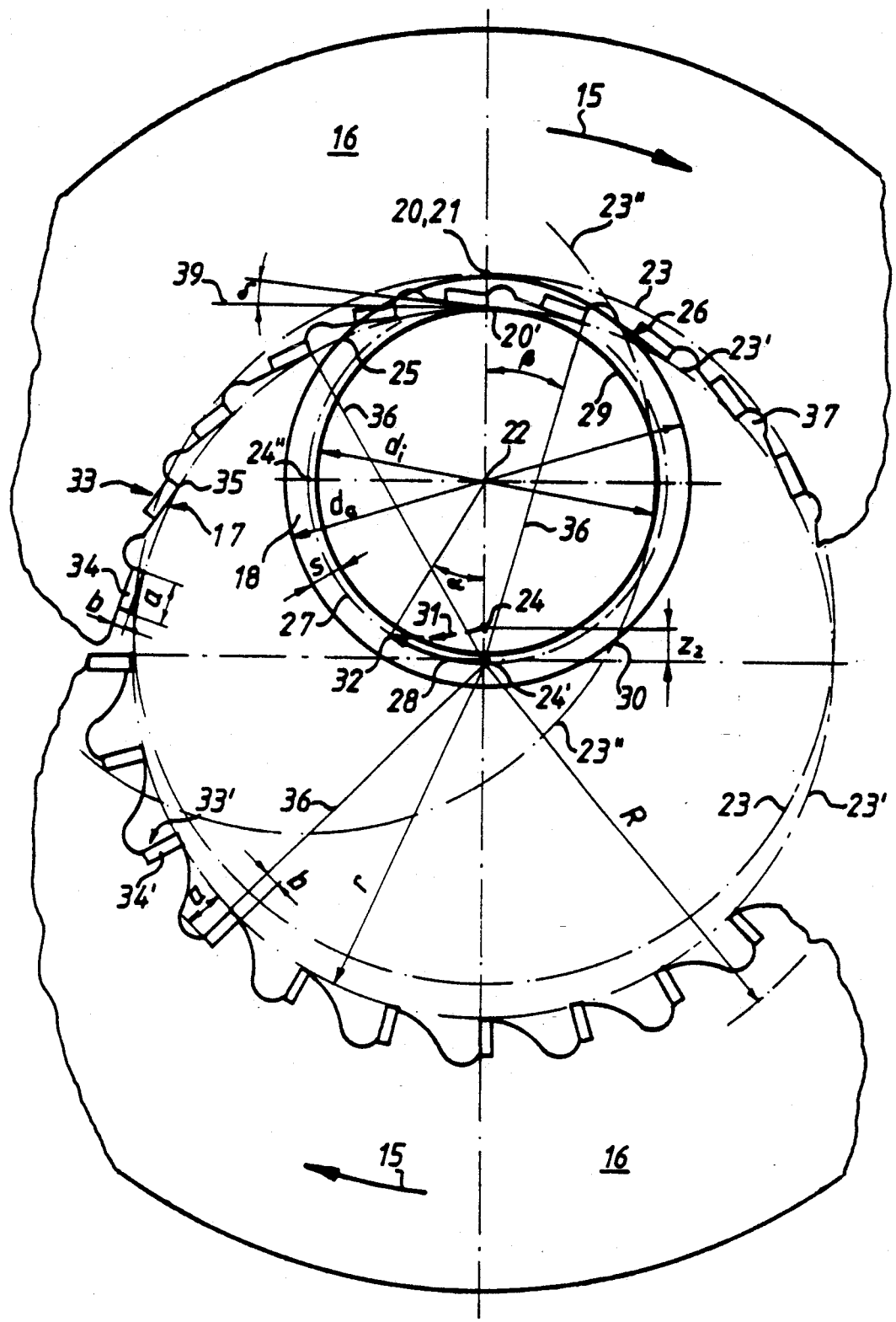
FIG. 3 shows a whirling tool as a circular saw blade having an internal tooth system in the working position and several variants.

In the representation shown in FIG. 3, the known whirling milling process is first of all shown and described: here, the whirling tool 16, on account of further, simply linear downward movement by the amount $z_2$, has already cut through the wall thickness s of the workpiece 18 in its top area. As a result, the center point 24 of the whirling tool 16 has traveled linearly downwards from point 24 to point 24' by the distance $z_2$. The topmost cutting tooth 20 at the same time travels to point 20'. The initial position of the inner envelope circle is here designated by 23, and the position of the inner envelope circle cutting through the tube wall is designated by 23'. In this position, the tube wall is cut through by the rotating tool 16 from point 25 via point 20' up to point 26. Since the rotating whirling tool is merely in a linear downward movement by the amount $z_2$, the actual whirling action does not yet take place, but only the plunge-cutting action. The actual whirling action, i.e. the rotary movement of the flight-circle center point 24' on the flight-circle center-point path 27, starts in this case only after the wall thickness s of the workpiece 18 is cut through. Only after that does the flight-circle center point 24' travel on the so-called flight-circle center-point path 27 in arrow direction 28. The constant rotary movement of the whirling tool 16 in arrow direction 15 is superimposed on this slow traveling movement of the so-called flight-circle center point 24' on the flight-circle center-point path 27. Accordingly, a rolling movement of the inner envelope circle 23' or the inner circumferential surface of the whirling tool 16 takes place on a circular path 29, which virtually corresponds to the inside diameter $d_i$ of the workpiece 18. The circular path 29 is slightly smaller than the inside diameter $d_i$ in order to ensure that the wall thickness s is actually cut through. The whirling tool therefore only needs to penetrate through the wall thickness s and then rolls on the circular path 29, in the course of which the flight-circle center point 24' travels on the flight-circle center-point path 27 in arrow direction 28. For example, the inner envelope circle is located in the position 23" when the flight-circle center point 24' has traveled through 90° up into the position 24". In this case, the outer circumferential surface of the workpiece has already been cut off up to point 30. A gradual peeling of the wall thickness of the workpiece 18 therefore takes place (see FIG. 3).

As shown in FIGS. 4b–4e, the whirling movement according to the invention is to start directly at the same time as the machining in order to enable the tool advantageously to slide tangentially into the workpiece.

A whirling movement right at the start of the cutting action is therefore to be superimposed on the linear plunge-cutting movement (described with reference to FIG. 3) of the whirling tool 16 having the internal tooth system 17 by linear lowering by the amount $z_2$ for cutting through the wall thickness s. For this purpose, the flight-circle center point 24, immediately after contact between the cutting teeth and the workpiece (point 20, 21) (FIG. 4b), is not guided linearly over the distance z but in a curve shape from point 24 on the circular path 41 in FIG. 4b along the curve 31 to point 32 on the flight-circle center-point path 27. A whirling movement is therefore immediately superimposed on the linear plunge-cutting movement, which whirling movement brings about an optimum tangential plunge-cutting movement into the workpiece. In this way, the cutting teeth 33 plunge even more smoothly and more tangentially into the workpiece. After the point 32 on the flight-circle center-point path 27 is reached, i.e. after performing a rolling movement about the angle $\alpha$, the flight-circle center point 24' runs further on the flight-circle center-point path 27. Only the actual whirling movement takes place after that.

Figure 4A:
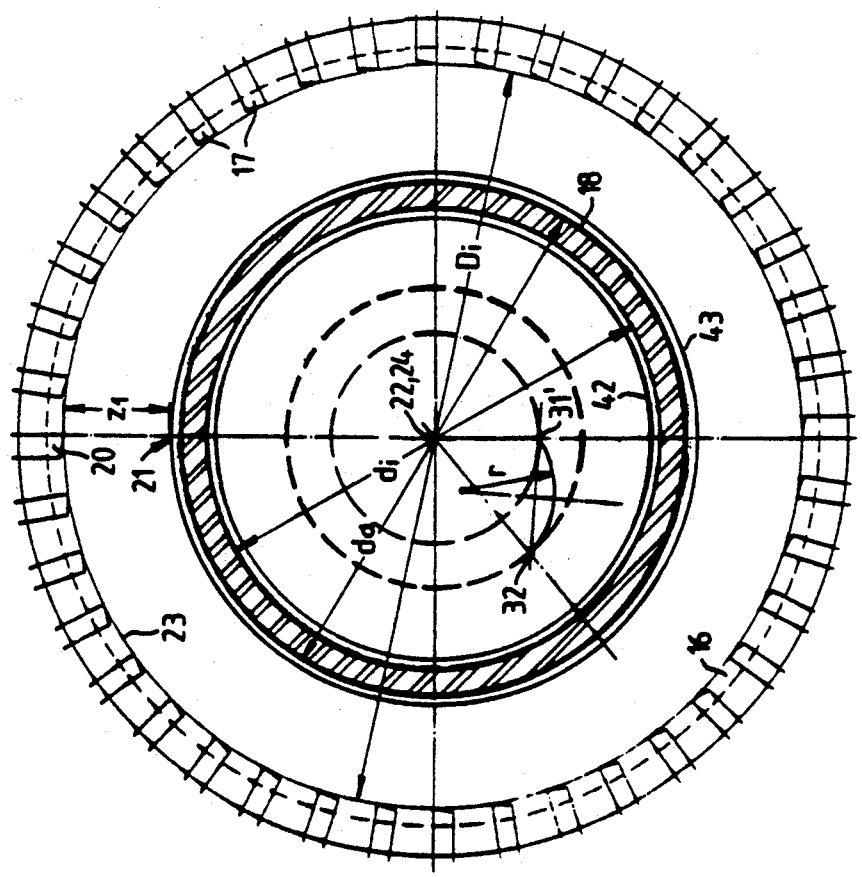
Figure 4D:
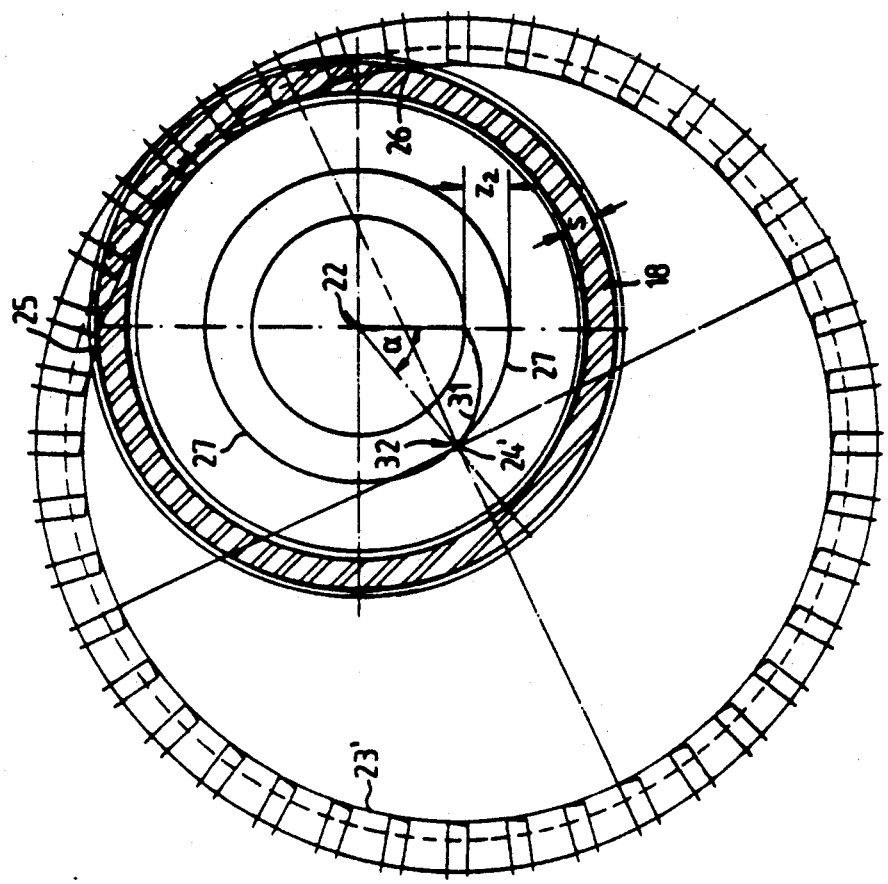
Figure 4C:
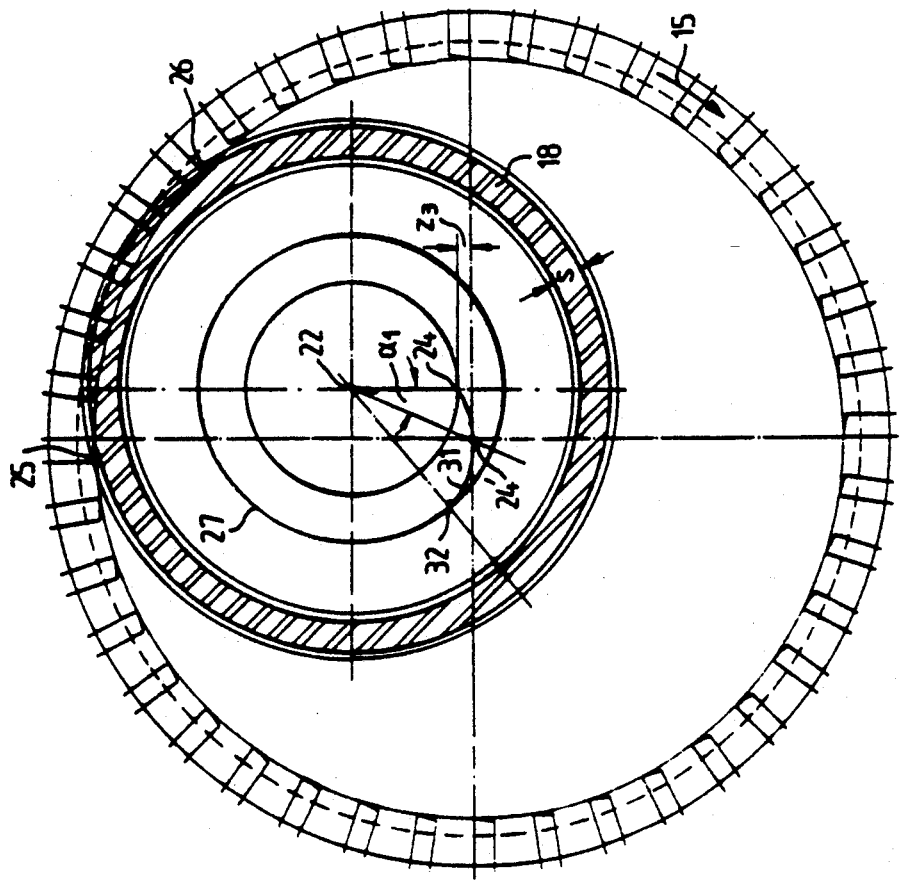

This action of the superimposed plunge-cutting and whirling movement along the curve 31 is shown in more detail in FIGS. 4b–4d. FIG. 4b shows the initial position from the moment of contact (point 20, 21) between whirling tool 16 and workpiece 18. At the start of the curve 31, the flight-circle center point 24 is located on the circular path 41. Simultaneously with the further feed in the Z-direction, the flight-circle center point 24 travels along the curve 31 through an angle $\alpha$.

In FIG. 4c, the flight-circle center point 24' on the curve 31 is arranged so as to offset by the angle $\alpha_1$ and the plunge-cut distance $z_3$ relative to the initial position (point 24). Here, the rotating whirling tool plunges into the workpiece at point 25 and comes out of the workpiece 18 at point 26. Although the wall thickness s of the workpiece is not yet cut through, the whirling movement has therefore already started.

In FIG. 4d, the flight-circle center point 24' has reached the end point 32 of the curve 31 on the flight-circle center-point path 27, and the wall thickness $s=z_2$ of the workpiece 18 is completely cut through. From this moment, the flight-circle center point 24' travels on the flight-circle center-point path 27, i.e. on an equidistant path relative to the centre point 22. A further position of the angle of rotation $\alpha_2=90°$ is shown in FIG. 4e. Here, the flight-circle center point 24' has traveled through $\alpha_2=90°$.

As apparent from FIGS. 4a, 4b, the curve 31 is formed as a circular arc having the radius r. The end points 31', 32 are determined as described above. Here, the angle $\alpha$ (point 32) is about 30°–60°, in particular 45°. The length of the radius r corresponds approximately to the distance $z_1$.

The effective plunge-cutting radius R of the whirling tool designed as a circular saw blade or whirling milling tool having an internal tooth system is selected to be so large that the wall thickness of the tube 18 can be cut through without hindrance. For a very thick-walled tube or a solid material, the plunge-cutting radius R of the whirling tool must be so large that this whirling tool cuts through at least the entire wall thickness or can at least penetrate the solid material as far as the center point 22 during the whirling process. The other half of the solid material is also cut off during the revolving whirling process. In contrast to a conventional circular saw blade having an external tooth system, the whirling tool therefore only needs to penetrate until the wall thickness of a tube is cut through or or only needs to penetrate at most half the workpiece.

The process works all the more effectively, the closer the inside diameter $D_i$ of the tool is adapted to the outside diameter $d_a$ of the workpiece, so that virtually tangential rolling is ensured. This relationship is designated as E-factor, where $D_i \approx (1.2 \text{ to } 2) \times d_a$.

The design of the cutting teeth is shown in more detail in FIG. 3. Shown in the bottom left-hand half of FIG. 3 are carbide-tipped cutting teeth 33' which consist of rectangular or trapezoidal carbide tips 34' which are arranged radially, i.e. directed outward, in their length. The trapezoidal design has the advantage that a welding phase is thereby formed on the workpiece during cutting. The rectangular tooth shape corresponds to the mere reversal of an external tooth system to form an internal tooth system. Such an arrangement is not so advantageous for an internal tooth system of a circular saw blade, since the carbide tips tangentially approach the workpiece only with their short side edge b, while the longer side edge a largely has no effect. The top half of FIG. 3 therefore shows an internal tooth system 17 in which the carbide tips 34 tangentially approach the workpiece 18 with their longitudinal edge a, while the shorter side edge b is perpendicular thereto. The front cutting edge 35 of each cutting tooth 33 is projected via the shorter side edge b to the centre point 24' (see line 36). The longer side edge a has a clearance angle $\alpha \approx 30°$ relative to the tangent 39. The front cutting edges 35 of each cutting tooth 33 are offset relative to one another at an angle $\beta$ of 15°. A chip space 37 is provided between the cutting teeth 33. Only some of the cutting teeth arranged on the inner cutting circle 23, 23' are shown in FIG. 3.

The inner envelope circle 23, 23' is at the same time the flight circle for the whirling process and forms the inner recess (inner recess of radius r) of the whirling tool designed as a saw blade having an internal tooth system.

The rectangular or trapezoidal cutting teeth 33 are mutually set in succession in order to obtain a certain clearance cut. They project beyond the width of the saw blade 16 so that the latter cannot jam. A welding phase which, for example, can amount to about 30° develops in the case of a trapezoidal tooth shape.

The invention is not restricted to the exemplary embodiment shown and described. On the contrary, it also comprises all refinements and further developments of the basic idea according to the invention by the person skilled in the art. The workpiece can of course also perform a linear or rotational movement in order to perform the cutting movement.

The workpiece can also be cut through by repeated plunging and rotation of the tool; i.e. any depth of cut can be set when the tool is orbiting on the flight-circle center-point path. During repeated orbiting, a plurality of curves 31 and corresponding flight-circle center-point paths are then available.

In FIGS. 4a-4e, the workpiece 18 has an inner circle 42 and an outer circle 43 as a tolerance allowance when the workpiece having the outside diameter $d_a$ and the inside diameter $d_i$ is cut through.

We claim:

1. Method of machining round material by the whirling process, comprising the steps of:

clamping a workpiece for machining into a whirling unit, the workpiece having a longitudinal center axis, the workpiece being held stationary with regard to the center axis;

traversably mounting a whirling, annular cutting tool having an internal tooth system and a flight-circle centerpoint on a compound slide;

moving said tool and said flight-circle center point in a perpendicular plane relative to the center axis, wherein movement of said flight-circle center point about the center axis defines a flight-circle center point path, said flight-circle center point path partially defining a cutting movement of said tool;

controlling said cutting movement in said plane using computer numerical control such that said flight-circle center point is displaced along a curve, said curve being defined by simultaneously moving said flight-circle center point by a desired plunge-cut depth in a linear direction into the workpiece and by moving said flight-circle center point circularly about the center axis, said curve intersecting said flight-circle center point path after an angle of rotation around the center axis; and displacing said flight-circle center point along said flight-circle center point path.

2. Method according to claim 1, wherein said controlling step includes controlling the cutting movement so that the curve has a beginning point at the location of said flight-circle center point when said tool initiates contact with the workpiece and an ending point at said flight-circle center point path, said desired plunge-cut depth being achieved during said angle of rotation.

3. Method according to claim 2, wherein said controlling step includes controlling the cutting movement so that the curve comprises a circular arc between said beginning point and said ending point, said circular arc having a radius corresponding approximately to the eccentricity between said tool and the workpiece, said circular arc being concave relative to the center axis.

4. Method according to claim 1, wherein said controlling step includes controlling the cutting movement so that the curve intersects said flight-circle center point path after an angle of rotation generally between about 30 to about 60 degrees.

5. Method according to claim 1, wherein the workpiece has an outside diameter and said traversably mounting step includes providing the tool with an inside diameter between about 1.2 to about 2 times the outside diameter of the workpiece.

6. Method according to claim 1, wherein said traversably mounting step includes the tool with an internal tooth system comprising plural carbide cutting tips, each said tip having an elongated edge orientated tangentially to said tool and a short edge orientated in a radial direction to said flight-circle center point.

7. Method according to claim 6, wherein said traversably mounting step includes providing the tool with an internal tooth system comprising plural carbide cutting tips, each said tip having a clearance angle being measured between said elongated edge and a tangent of said tool, said clearance angle being generally about 30 degrees.

8. Method according to claim 1, wherein said traversably mounting step includes providing the tool with an internal tooth system comprising a plurality of cutting teeth being mutually set in succession whereby a cut is produced in the workpiece which is wider than the width of said tool.

* * * * *